(No Model.)

F. M. BLAKE.
ADJUSTABLE METALLIC PACKING.

No. 318,082. Patented May 19, 1885.

Witnesses

Inventor
F. M. Blake

UNITED STATES PATENT OFFICE.

FRANCIS M. BLAKE, OF WORCESTER, MASSACHUSETTS.

ADJUSTABLE METALLIC PACKING.

SPECIFICATION forming part of Letters Patent No. 318,082, dated May 19, 1885.

Application filed October 29, 1883. (No model.)

*To all whom it may concern:*

Be it known that I, FRANCIS M. BLAKE, a citizen of the United States, residing at Worcester, in the county of Worcester and State of Massachusetts, have invented a new and useful Improvement in Adjustable Metallic Packings, of which the following is a specification.

My invention relates to a metallic packing for packing piston-rods, valve-stems, or other reciprocating parts of engines or other machines, or for adjusting the bearings in machines where it is desirable to compensate for the wear caused by either reciprocating or rotating shafts; and it consists in a spiral metallic coil of, preferably, some suitable anti-friction metal resting against the surface or surfaces to be packed, with means for expanding or contracting the coils, as hereinafter set forth.

Certain portions of a locomotive-engine are shown in the accompanying drawings as illustrating my improved metallic packing in these and analogous uses.

Figure 1:
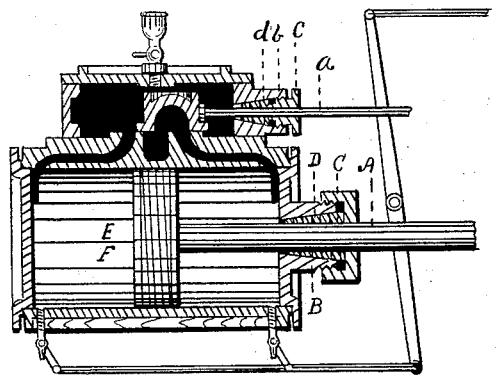
Figure 2:
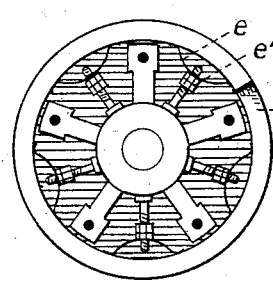
Figure 3:
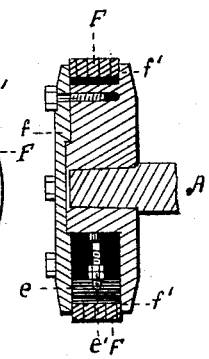
Figure 4:
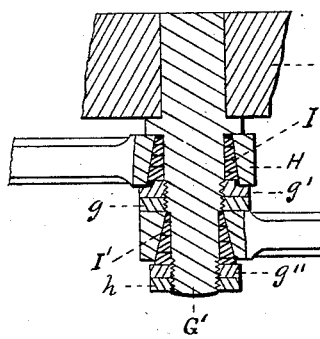
Figure 4:
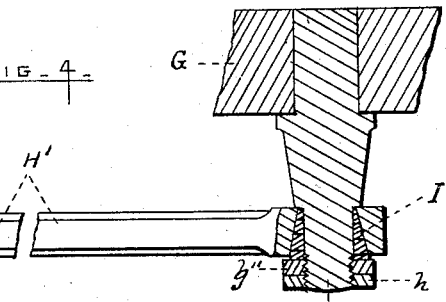
Figure 5:
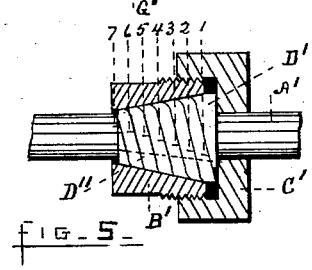
Figure 6:
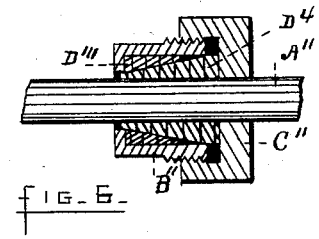

Figure 1 represents a sectional view of the cylinder; Figs. 2 and 3, sectional views of the piston; Fig. 4, a sectional view showing the crank-pin bearings of one of the main connecting and coupling rods. Fig. 5 represents a bearing for a rotating or sliding shaft, and Fig. 6 shows the packing applied to a box having a straight internal chamber.

Similar letters refer to similar parts in the several views.

A is the piston-rod; B, the stuffing-box having a conical chamber. C is the cap-nut screwing on a thread upon the outside of a stuffing-box. D is a strip of Babbitt metal, gun-metal, brass, or other suitable material wound to form a spiral coil of conical form, filling the chamber of the stuffing-box and having an internal bore to fit the piston-rod A. The cap-nut C rests against the end of the packing D, which projects beyond the stuffing-box B a short distance. As the nut C is screwed onto the stuffing-box the conical spiral coil is forced into the conical chamber of the stuffing-box, contracting its internal bore and increasing its pressure upon the piston-rod A.

Similar parts in the packing of the valve-stem are indicated by $a$, $b$, $c$, and $d$, except that $c$ screws into the chamber of the box $b$.

As the nut C is withdrawn the elasticity of the metal coil D will expand sufficiently to relieve the rod A from pressure.

Instead of winding the coil from a metallic strip, a cone may be turned of the proper size and bore and cut apart on a spiral line. I also pack the piston by a spiral coil of metal, F, placed in the usual position of a packing-ring, between the sides $f'$ $f'$ and the follower $f$, and I expand the coils against the inner surface of the cylinder by means of suitable packing-springs.

In Figs. 2 and 3 I have shown one form of packing-springs $e$ and adjusting-nuts $e'$ which is in common use. The spiral coil should fill the space between $f'$ and the follower $f$, and as it is expanded by the force of the springs $e$ against its inner surface the coil expands at all points of its circumference, maintaining a true circle upon its outer surface.

In Fig. 4, G G represent sectional views of a portion of the driving-wheels; $G'$ $G'$, the crank-pins; H, the main connecting-rod, and $H'$ the coupling-rod. These rods are made with solid ends having a tapering hole larger than the diameter of the crank-pin. Into these I place the conical packing-ring I and $I'$, consisting, as in the case of the piston-rod and valve-stem, of spirally-wound strips of some suitable metal. The packing is forced into the tapering hole in the rod H by means of the nut $g'$ on the crank-pin G, which is provided with a screw-thread. The nut $g'$ is then held in place by the check-nut $g$. The packing $I'$ on the ends of the coupling-rods $H'$ similarly adjusted by means of the nuts $g''$ $g''$ and check-nuts $h$ $h$.

The shifting of the bearing-surface of the packing is shown in the case of a conical coil in Fig. 5, in which $B'$ represents a box or bearing for a sliding or rotating shaft, $A'$. $D'$ is a spiral conical packing adjusted by the follower or nut $C'$, as already described in the case of the piston-rod A, Fig. 1. As the spirally-coiled packing $D'$ is forced into the tapering chamber of the box $B'$, coil 1 will be wound up a short distance, sufficient to contract the bore or internal diameter to fit the shaft $A'$ accurately, coil 2 will be wound up double the distance by its own contraction and by the motion of coil No. 1, coil 3 will move three times the distance of coil 1, and so on, so that if a line, D'', be drawn across the coils and the coils contracted the portions of the line on each coil will assume the positions as indicated by 1 2 3 4 5 6 7, and from the conical form of the packing it will be observed that the coil 7, while moving the greatest distance, offers the least resistance owing to the thinness of the metal, and that the resistance of the coils to compression varies inversely to the distance of movement. By this unequal motion of the several coils a different surface of the packing is brought with each adjustment into the positions of greatest wear.

Fig. 6 represents a box, B'', having a straight or cylindrical internal chamber in which the tapering sides are formed by a spirally-wound packing, D''', cylindrical on the outside to fit the chamber in the box B'', and tapering upon the inside to receive the conical spiral packing $D^4$. By this use of the two spiral packings I am able to compress the shaft $A^4$ by the action of the nut C''', and at the same time expand the coil D''', and consequently pack the interior surface of the walls of the chamber.

The adjustable spiral packing above described is equally adapted to all cases where the wear of sliding, rotating, or reciprocating shafts requires an adjustment of the bearing-surfaces; and its advantages of preserving the cylindrical form of the bearing, and also of varying the bearing-surface, which may be subjected to the greatest wear, are secured, whether expanded by springs from beneath, as in the case of a piston-packing, or contracted by a cap or nut or any other suitable means, and such use I consider within the scope of my invention, whether applied to the several bearing-surfaces of engines, or to other machines—such as the rotating shafts of wood-working machines, the spindles of spinning machinery, or other analogous uses.

I am aware that a spiral metallic packing has been heretofore used. Such I do not claim, broadly. Neither do I claim a spiral packing of a conical form, as such has been heretofore used, and one form of such packing was shown in the Letters Patent No. 168,344, October 5, 1875, in which a conical packing is placed in a cylindrical chamber or stuffing-box and compressed upon the piston-rod by a gland fitting the conical surface of the spiral packing-ring, a seat in the bottom of the stuffing-box receiving the larger end of the metallic packing, thereby preventing the passage of steam past the end of the packing-ring. In this method of applying the conical spiral ring an effective packing is only secured upon the surface of the rod. In my method the walls of the stuffing-box are made tapering, and form of themselves a seat for the conical packing, which is compressed by a pressure applied to its larger end; but What I do claim, and desire to secure by Letters Patent, is—

1. The combination, with a sliding or rotating shaft or piston-rod and its fixed box or bearing, of a double spiral metallic packing, consisting of an outer spiral coil having a tapered hole and a conical spiral coil filling the tapered hole of the outer coil, and all inclosing said shaft or piston-rod and contained in its fixed bearing or box, and means for applying pressure to the larger end of the inner coil, whereby it is compressed upon the shaft and the outer coil expanded against the inner walls of the fixed box or bearing, as and for the purpose set forth.

2. The combination of rod or shaft A', box B', having a cylindrical annular chamber, packing-rings D', consisting of a conical spiral ring, packing-ring D'', consisting of a spiral ring having a tapering hole corresponding with the conical surface of the ring D', and a follower or nut, C', resting upon the larger end of the coil D', with connected means for pressing the nut C' upon the coil D', as and for the purpose set forth.

F. M. BLAKE.

Witnesses:
RUFUS B. FOWLER,
GEO. E. SMITH.